(12) United States Patent
Reese

(10) Patent No.: US 10,503,754 B2
(45) Date of Patent: Dec. 10, 2019

(54) BULK LOADING MULTIPLE HIERARCHICAL LEVELS OF RELATIONAL DATA TO A DATABASE

(71) Applicant: Citrix Systems, Inc., Fort Lauderdale, FL (US)

(72) Inventor: Benjamin Reese, Brighton (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 273 days.

(21) Appl. No.: 15/598,759

(22) Filed: May 18, 2017

(65) Prior Publication Data

US 2018/0336261 A1    Nov. 22, 2018

(51) Int. Cl.
*G06F 16/28* (2019.01)
*G06F 16/22* (2019.01)
*G06F 16/23* (2019.01)

(52) U.S. Cl.
CPC ........ *G06F 16/282* (2019.01); *G06F 16/2246* (2019.01); *G06F 16/2386* (2019.01)

(58) Field of Classification Search
CPC combination set(s) only.
See application file for complete search history.

(56) References Cited

U.S. PATENT DOCUMENTS

| | | | |
|---|---|---|---|
| 7,603,377 B2 | 10/2009 | Awad et al. | |
| 8,140,558 B2 | 3/2012 | Kiefer et al. | |
| 2002/0156811 A1* | 10/2002 | Krupa | G06F 16/284 715/234 |
| 2009/0112913 A1 | 4/2009 | Murthy et al. | |
| 2015/0261694 A1* | 9/2015 | Roberts | G06F 16/258 710/67 |
| 2016/0350358 A1* | 12/2016 | Patel | G06F 16/1748 |

* cited by examiner

*Primary Examiner* — Shyue Jiunn Hwa
(74) *Attorney, Agent, or Firm* — Allen, Dyer, Doppelt + Gilchrist, PA

(57) ABSTRACT

A computing system includes a processor, a program memory to store an application, and a database. The processor executes the application to store objects in the program memory, with the objects being organized in a relational hierarchy having a plurality of levels, with each object having a respective pseudo-key associated therewith. The processor writes the objects and their respective pseudo-keys in a first level of the relational hierarchy to the database to generate the first level of the relational hierarchy with real keys. The processor receives a first level key map mapping the pseudo-keys with the real keys for the objects in the first level of the relational hierarchy, reconciles the pseudo-keys for the objects in a second level of the relational hierarchy with the first level key map, and writes the objects and their respective reconciled pseudo-keys in the second level of the relational hierarchy to the database.

22 Claims, 4 Drawing Sheets

BULK LOADING MULTIPLE HIERARCHICAL LEVELS OF RELATIONAL DATA TO A DATABASE

TECHNICAL FIELD

The present invention relates to the field of databases, and more particularly, to efficiently writing data having a hierarchical relationship to a database.

BACKGROUND

Parent-child relationships are very common in relational database schemas. For example, a database schema might indicate a relationship between a manager (parent) and one or more employees (children) who are subordinate to that manager. For another example, a database schema might indicate a relationship between a purchase order (parent) and one or more lines (children) that are a part of that purchase order. Data that contains such parent-child relationships is called hierarchical data since the parent-child relationships form a hierarchy.

When applications need to save relational data to a database the key of the parent record needs to be known in advance of saving a child record that is bound to it. This requires the application to query the database for each parent record it encounters to determine the corresponding key before writing the child record. In addition, if there is a third level in the hierarchy, the second level record needs to be saved before the new key can be known and applied to the third level, and so on.

This leads to an inefficient use of network and database resources as each object in a row is sent to the database one at a time, recursively though the data hierarchy. For example, in a data set that has 3 levels of data with each parent having 10 children, this results in 1110 (10+100+1000) individual calls to the database.

SUMMARY

A computing system includes a processor, a program memory coupled to the processor and configured to store an application, and a database coupled to the processor and said program memory. The processor may be configured to execute the application to perform the following. A plurality of objects may be stored in the program memory, with the plurality of objects being organized in a relational hierarchy having a plurality of levels, and with each object having a respective pseudo-key associated therewith indicating its position within the relational hierarchy.

The objects and their respective pseudo-keys in a first level of the relational hierarchy are written to the database, with the database matching each pseudo-key in the first level with a real or actual key so as to generate the first level of the relational hierarchy with real keys. A first level key map or first level map mapping the pseudo-keys with the real keys for the objects in the first level of the relational hierarchy is received. The pseudo-keys for the objects in a second level of the relational hierarchy are reconciled with the first level key map. The objects and their respective reconciled pseudo-keys in the second level of the relational hierarchy are written to the database.

The application as executed by the processor advantageously allows bulk data to be efficiently written from the program memory to the database. Once the structure of the whole relational hierarchy is known, then the bulk data may be written to the database. The bulk loading is advantageously performed without being able to know in advance the internal database keys that will tie those relationships together.

The processor may further perform the following for a next level in the relational hierarchy. A second level key map or second level map mapping the pseudo-keys with the real keys for the objects in the second level of the relational hierarchy is received. The pseudo-keys for the objects in a third level of the relational hierarchy are reconciled with the second level key map. The objects and their respective reconciled pseudo-keys in the third level of the relational hierarchy are written to the database.

The processor may further repeat the receive, reconcile and write steps for each additional level of the relational hierarchy. This advantageously allows an unlimited depth of relationships to be handled.

A complete structure of the relational hierarchy may be known before the processor performs a write to the database.

The respective pseudo-keys may be used to maintain relationships between the plurality of objects in the plurality of levels in the program memory.

The reconciling may comprise mapping the pseudo-keys for the objects in the second level with the real keys for the objects in the first level.

Writing the objects and their respective pseudo-keys in the first level of the relational hierarchy to the database may be performed in a single CALL statement. Writing the objects and their respective reconciled pseudo-keys in the second level of the relational hierarchy to the database is performed in a single CALL statement that is separate from the single CALL statement used for the first level.

Another aspect is directed to a method of operating a computing system as described above. In particular, the processor may be operated to execute the application to perform the following. A plurality of objects may be stored in the program memory, with the plurality of objects being organized in a relational hierarchy having a plurality of levels, and with each object having a respective pseudo-key associated therewith indicating its position within the relational hierarchy. The objects and their respective pseudo-keys in a first level of the relational hierarchy are written to the database, with the database matching each pseudo-key in the first level with a real key so as to generate the first level of the relational hierarchy with real keys. A first level key map mapping the pseudo-keys with the real keys for the objects in the first level of the relational hierarchy is received. The pseudo-keys for the objects in a second level of the relational hierarchy are reconciled with the first level key map. The objects and their respective reconciled pseudo-keys in the second level of the relational hierarchy are written to the database.

Yet another aspect is directed to a non-transitory computer readable memory having a plurality of computer executable instructions for causing a computing system comprising a processor, a program memory coupled to the processor and configured to store an application, and a database coupled to the processor and the program memory to perform the method steps as described above.

DETAILED DESCRIPTION

The present disclosure will now be described more fully hereinafter with reference to the accompanying drawings, in which preferred embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
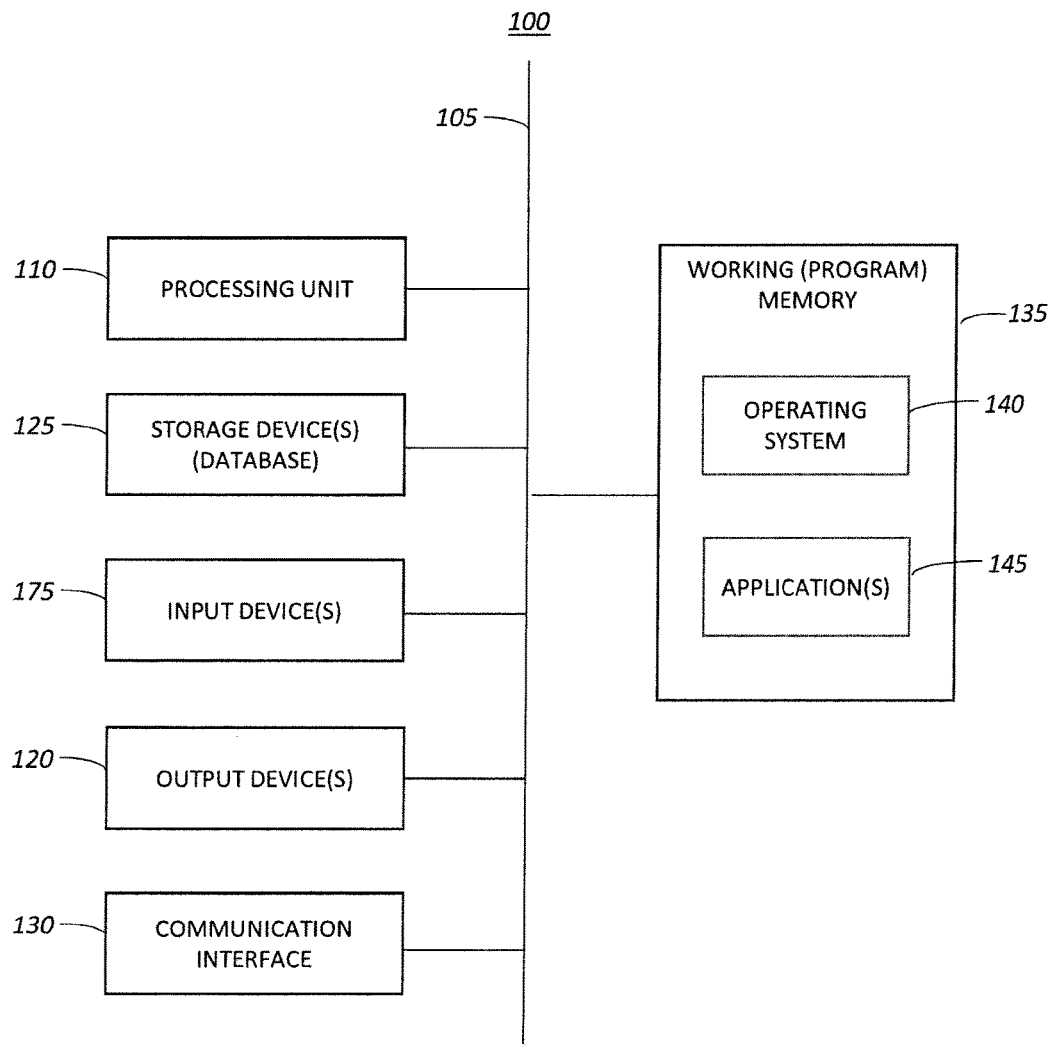
FIG. 1 is a block diagram of a computer system for bulk loading multiple hierarchical levels of relational data from a program memory to a database in accordance with the present disclosure.

Referring initially to FIG. 1, a computer or computing system 100 for bulk loading relational data generated by an application 145 to a database 125 will be discussed. The application 145 is operating in a program memory 135 separate from the database 125. The relational data represents multiple levels in a relational hierarchy and will be written in bulk from the program memory 135 to the database 125 without being able to know in advance the internal database keys that will tie those relationships together.

The illustrated computer system 100 is meant to provide a generalized illustration of various components, any or all of which may be utilized as appropriate. The computer system 100, therefore, broadly illustrates how individual system elements may be implemented in a relatively separated or relatively more integrated manner.

The computer system 100 is shown comprising hardware elements that can be electrically coupled via a bus 105 or may otherwise be in communications, as appropriate. The hardware elements may include a processing unit 110 including without limitation one or more general-purpose processors and/or one or more special-purpose processors (such as digital signal processing chips, graphics acceleration processors, or other appropriate data processor); one or more input devices 115, which can include without limitation a mouse, a keyboard, a touchscreen, a global positioning system (GPS) receiver, a motion sensor, a camera, and/or the like; and one or more output devices 120, which can include without limitation a display device, a speaker, a printer, and/or the like.

The computer system 100 may further include (and/or be in communication with) one or more non-transitory computer-readable storage mediums or devices 125, which can comprise, without limitation, local and/or network accessible storage, and/or can include, without limitation, a disk drive, a drive array, an optical storage device, a solid-state storage device such as a random access memory (RAM) and/or a read-only memory (ROM), which can be programmable, flash-updateable and/or the like. Such storage devices may be configured to implement any appropriate data stores, including without limitation, various file systems, database structures, and/or the like. For illustration purposes, the non-transitory computer-readable storage mediums or devices 125 includes the database 135 that is to receive bulk loading of relational data generated by the application 145 operating within the working memory 135.

The computer system 100 may also include a communication interface 130, which can include without limitation a modem, a network card (wireless or wired), an infrared communication device, a wireless communication device and/or chipset (such as a Bluetooth™ device, an 802.11 device, a WiFi device, a WiMax device, an NFC device, cellular communication facilities, etc.), and/or similar communication interfaces. The communication interface 130 may permit data to be exchanged with a network, other computer systems, and/or any other devices described herein.

The computer system 100 may further include one or more receivers and one or more transmitters. For example, the communication interface 130 may include one or more receivers and one or more transmitters. In another example, the computer system 100 may include one or more transceivers, one or more receivers, and/or one or more transmitters that are separate from the communication interface 130.

The computer system 100 may further comprise a non-transitory working memory 135, which can include a RAM or ROM device, as described above. The working memory 135 may also be referred to as a program memory.

The computer system 100 also can comprise software elements, shown as being currently located within the working memory 135, including an operating system 140, device drivers, executable libraries, and/or other code, such as one or more application programs 145. The one or more application programs 145 may comprise computer programs provided by various embodiments, and/or may be designed to implement methods, and/or configure systems, provided by other embodiments, as described herein.

Merely by way of example, one or more procedures described with respect to the method(s) discussed herein might be implemented as code and/or instructions executable by a computer (and/or a processor within a computer). In an aspect, then, such code and/or instructions can be used to configure and/or adapt a general purpose computer (or other device) to perform one or more operations in accordance with the described methods.

A set of these instructions and/or code might be stored on a computer-readable storage medium, such as the one or more non-transitory computer-readable storage mediums or devices 125 described above. In some cases, the storage medium might be incorporated within a computer system, such as computer system 100.

In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system.

The computer system 100 may be used to perform methods in accordance with the disclosure. For example, some or all of the procedures of the described methods may be performed by the computer system 100 in response to processing unit 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processing unit 110 to perform one or more procedures of the methods described herein.

In an embodiment implemented using the computer system 100, various computer-readable storage media might be involved in providing instructions/code to the processing unit 110 for execution and/or might be used to store and/or carry such instructions/code (e.g., as signals). In many implementations, a computer-readable storage medium is a physical and/or tangible storage medium. Such a medium may take many forms, including but not limited to, non-volatile media, volatile media, and transmission media.

Non-volatile media include, for example, optical and/or magnetic disks, such as the storage device(s) 125. Volatile media include, without limitation, dynamic memory, such as the working memory 135.

Transmission media include, without limitation, coaxial cables, copper wire and fiber optics, including the wires that comprise the bus 105, as well as the various components of the communication interface 130 (and/or the media by which the communication interface 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 130 (and/or components thereof) generally will receive the signals, and the bus 105 then might carry the signals (and/or the data, instructions, etc. carried by the signals) to the working memory 135, from which the processor(s) 105 retrieves and executes the instructions. The instructions received by the working memory 135 may optionally be stored on a non-transitory storage device 125 either before or after execution by the processing unit 110.

Figure 2:
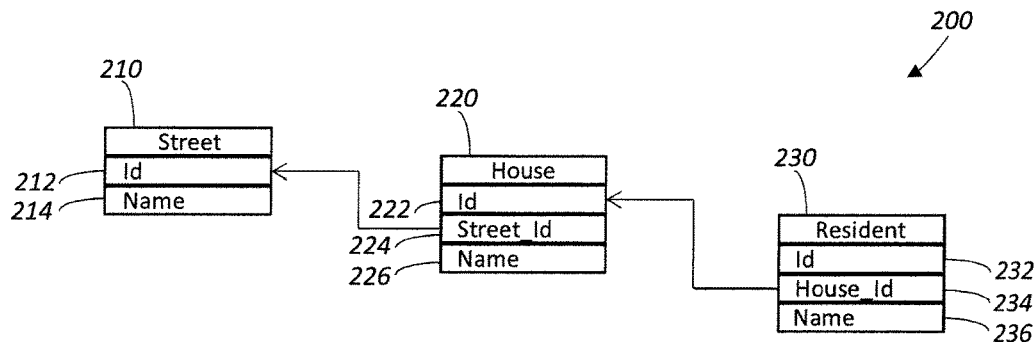
FIG. 2 is an example database entity diagram used to illustrate multiple hierarchical levels of relational data in a database.

Referring now to FIG. 2, an example database entity diagram 200 is provided to illustrate data having a hierarchical relationship. For comparison purposes, traditional row by row inserts of data into a database will be discussed in reference to FIG. 3 based on the database entity diagram 200, and then bulk loading of the same data into the database 125 will discussed in reference to FIG. 4 based on the database entity diagram 200.

The relational hierarchy of the illustrated database entity diagram 200 is divided into streets 210, houses 220 on the streets, and residents 230 in the houses. Each street 210 has a unique ID 212 and a name 214; each house 220 has a unique ID 222, a reference to its street's ID 224 and a name 226; and each resident 230 has a unique ID 232, a reference to their house's ID 234 and a name 236.

As readily understood by those skilled in the art, the database 125 includes a database engine or storage engine. The database engine is the underlying software component that a database management system (DBMS) uses to create, read, update, and delete data from a database. The database engine within the database 125 is responsible for assigning the IDs, and it is only possible to know what the ID is for each item after the database record is created.

As an example, the database entity diagram 200 has been generated by a population census service, and a marketing organization would like to import this data into a database 125. The following discussion illustrates the traditional row by row inserts of data into the database 125.

The data within the database entity diagram 200 is organized as follows:

Street: Compass Street $210_1$
    House: North House $220_1$
        Resident: Mr. North $230_1$
        Resident: Mrs. North $230_2$
        Resident: North Jr. $230_3$
    House: South House $220_2$
        Resident: Billy South $230_4$
Street: Color Street $210_2$
    House: Blue House $220_3$
        Resident: James Blue $230_5$
        Resident: Jane Blue $230_6$
    House: Green House $220_4$
        Resident: Adam Green $230_7$
Street: Number Street $210_3$
    House: No1 $220_5$
        Resident: Bill Smith $230_8$
        Resident: Tom Jones $230_9$
    House: No2 $220_6$
        Resident: Annie Body $230_{10}$
    House: No3 $220_7$
        Resident: Shelly Wright $230_{11}$ For the marketing organization to create their database records, the following is performed:

Create Street Record (Name = Compass Street)
Write to Database ->
<- Return Street ID (St1)
Create House record (Street_Id = St1, Name = North House)
Write to database ->
<- Return House record ID (Hs1)
Create Resident record (House_Id = Hs1, Name = Mr. North)
Write to database ->
<- Return Resident record ID (Rs1)
Create Resident record (House_Id = Hs1, Name = Mrs. North)
Write to database ->
<- Return Resident record ID (Rs2)
Create Resident record (House_Id = Hs1, Name = North Jr.)
Write to database ->
<- Return Resident record ID (Rs3)
Create House record (Street_ID = St1, Name = South House)
Write to database ->
<- Return House record ID (Hs2)
Create Resident record (House_IDd = Hs2, Name = Billy -continued

```
South)
        Write to database ->
        <- Return Resident record ID (Rs4)
        Create Street Record (Name = Color Street)
        Write to Database ->
        <- Return Street ID (St2)
        Create House record (Street_Id = St2, Name = Blue
House)
        Write to database ->
        <- Return House record Id (Hs3)
        Create Resident record (House_ID = Hs3, Name = James
Blue)
        Write to database ->
        <- Return Resident record ID (Rs5)
        Create Resident record (House_ID = Hs3, Name = Jane
Blue)
        Write to database ->
        <- Return Resident record ID (Rs6)
        Create House record (Street_ID = St2, Name = Green
House)
        Write to database ->
        <- Return House record ID (Hs4)
        Create Resident record (House_ID = Hs4, Name = Adam
Green)
        Write to database ->
        <- Return Resident record ID (Rs7)
        Create Street Record (Name = Number Street)
        Write to Database ->
        <- Return Street ID (St3)
        Create House record (Street_ID = St3, Name = No1)
        Write to database ->
        <- Return House record ID (Hs5)
        Create Resident record (House_ID = Hs5, Name = Bill
Smith)
        Write to database ->
        <- Return Resident record ID (Rs8)
        Create Resident record (House_ID = Hs5, Name = Tom
Jones)
        Write to database ->
        <- Return Resident record ID (Rs9)
        Create House record (Street_ID = St3, Name = No2)
        Write to database ->
        <- Return House record Id (Hs6)
        Create Resident record (House_ID = Hs6, Name = Annie
Body)
        Write to database ->
        <- Return Resident record ID (Rs10)
        Create House record (Street_ID = St3, Name = No3)
        Write to database ->
        <- Return House record Id (Hs7)
        Create Resident record (House_ID = Hs7, Name = Shelly
Wright)
        Write to database ->
        <- Return Resident record ID (Rs11)
```

In this example there are 21 separate writes to the database 125 (3 Streets, 7 Houses and 11 Residents). Each write inserts an item in a single row and returns the key of the inserted record. This leads to an inefficient use of network and database resources as each object in a row is sent to the database 125 one at a time, recursively though the data hierarchy.

Figure 3:
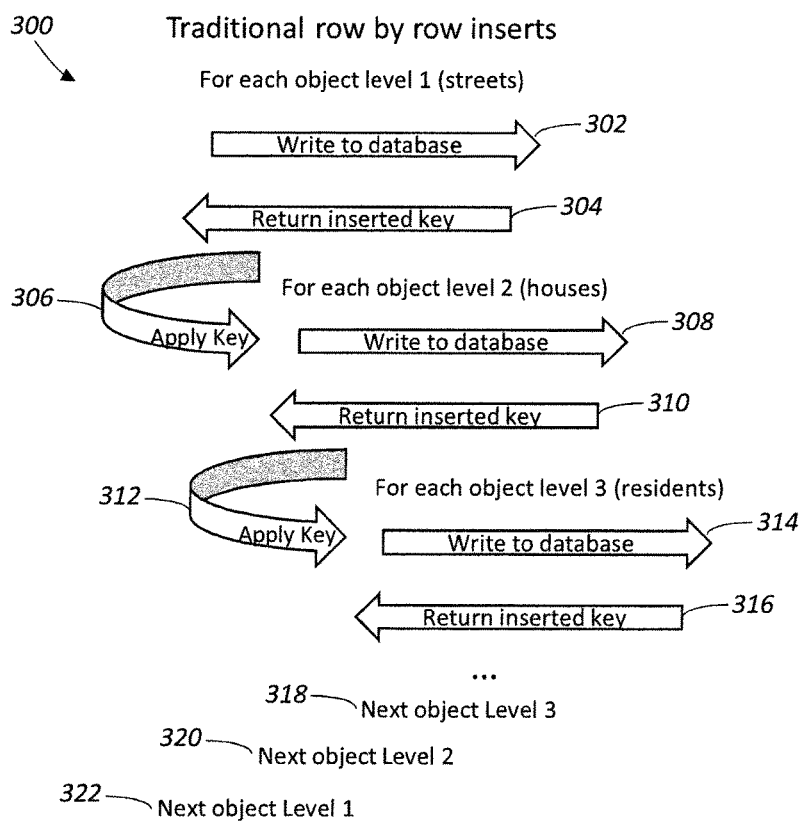
FIG. 3 is a traditional row by row insert diagram for loading data in the example database entity diagram illustrated in FIG. 2 to a database.

This traditional row by row insert of data into the database 125 is also illustrated by diagram 300 in FIG. 3. The street/house/resident data forms 3 levels in a relational hierarchy. Level 1 corresponds to the streets, level 2 corresponds to the houses, and level 3 corresponds to the residents.

In the traditional row by row insert diagram 300, a street in level 1 is written to the database 125 at step 302, and the database 125 then returns a corresponding key for that street at step 304. Next, the corresponding key just returned from the level 1 write is applied at step 306 along with a house in level 2 being written to the database 125 at step 308. The database 125 then returns a corresponding key for that house at step 310. Next, the corresponding key just returned from the level 2 write is applied at step 312 along with a resident in level 3 being written to the database 125 at step 314. The database 125 then returns a corresponding key for that resident at step 316. To continue writing objects to the database 125, the above process repeats itself as objects in each row are sent to the database 125 one at a time, recursively though the data hierarchy, as collectively indicated by steps 318, 320 and 322 until all of the data in the database entity diagram 200 has been written to the database 125.

In the above illustrated example, when an application 145 operating in a program memory 135 needs to save relational data to the database 125 the key of the parent record needs to be known in advance of saving a child record that is bound to it. This requires the application 145 to query the database 125 for each parent record it encounters to determine the corresponding key before writing the child record. In addition, for a third level in the hierarchy, the second level record needs to be saved before the new key can be known and applied to the third level, and so on.

Bulk loading of the same street/house/resident data as provided in the database entity diagram 200 will be discussed in reference to diagram 400 in FIG. 4. In the bulk loading approach, all of the records for the whole hierarchy are first gathered and stored in the program memory 135 using pseudo-keys. This corresponds to reference 410. For example, the following is performed by the marketing organization to create this data using temporary keys:

```
        Create Street Record (Id= TmpSt1, Name =
Compass Street)
        Create House record (Id=TmpHs1, Street_Id = TmpSt1,
Name = North House)
        Create Resident record (Id = TmpRs1, House_Id =
TmpHs1, Name = Mr North)
        Create Resident record (Id = TmpRs2, House_Id =
TmpHs1, Name = Mrs North)
        Create Resident record (Id = TmpRs3, House_Id =
TmpHs1, Name = North Jr)
    Create House record (Id = TmpHs2, Street_Id = TmpSt1, Name =
South House)
        Create Resident record (Id = TmpRs4, House_Id =
TmpHs2, Name = Billy South)
        Create Street Record (Name = Colour Street)
        Create House record (Id=TmpHs3, Street_Id = TmpSt2,
Name = Blue House)
        Create Resident record (Id = TmpRs5, House_Id =
TmpHs3, Name = James Blue)
        Create Resident record (Id = TmpRs6, House_Id =
TmpHs3, Name = Jane Blue)
    Create House record (Id=TmpHs4, Street_Id =TmpSt2, Name =
Green House)
        Create Resident record (Id = TmpRs7, House_Id =
TmpHs4, Name = Adam Green)
        Create Street Record (Id = TmpSt3 Name = Number
Street)
        Create House record Id=TmpHs5, (Id = Street_Id =
TmpSt3, Name = No1)
        Create Resident record (Id = TmpRs8, House_Id =
TmpHs5, Name = Bill Smith)
        Create Resident record (Id = TmpRs9, House_Id =
TmpHs5, Name = Tom Jones)
        Create House record (Id=TmpHs6, Street_Id = TmpSt3, Name =
No2)
        Create Resident record (Id = TmpRs10, House_Id =
TmpHs6, Name = Annie Body)
        Create House record (Id=TmpHs7, Street_Id = TmpSt3,
Name = No3, No. Bedrooms = 1)
        Create Resident record (Id = TmpRs11, House_Id =
TmpHs7, Name = Shelly Wright)
```

After collection of the above data, the process of writing objects to the database 125 in bulk and remapping the temporary keys (i.e., pseudo-keys) can now begin. This corresponds to reference 440. The process is as follows:

```
         Write Street records to database ->
<- Return Street Id Map
TmpSt1 = St1
TmpSt2 = St2
TmpSt3 = St3
         Update house records with Street_Id of TmpSt1 to St1
         Update house records with Street_Id of TmpSt2 to St2
         Update house records with Street_Id of TmpSt3
    to St3
         Write House records to database ->
<- Return House Id Map
TmpHs1 = Hs1
TmpHs2 = Hs2
TmpHs3 = Hs3
TmpHs4 = Hs4
TmpHs5 = Hs5
TmpHs6 = Hs6
TmpHs7 = Hs7
         Update Resident records with House_Id of TmpHs1 to Hs1
         Update Resident records with House_Id of TmpHs2 to Hs2
         Update Resident records with House_Id of TmpHs3 to Hs3
         Update Resident records with House_Id of TmpHs4 to Hs4
         Update Resident records with House_Id of TmpHs5 to Hs5
         Update Resident records with House_Id of TmpHs6 to Hs6
         Update Resident records with House_Id of TmpHs6 to Hs7
         Write Resident records to database ->
<- Return Resident Id Map
TmpRs1 = Rs1
TmpRs2 = Rs2
TmpRs3 = Rs3
TmpRs4 = Rs4
TmpRs5 = Rs5
TmpRs6 = Rs6
TmpRs7 = Rs7
TmpRs8 = Rs8
TmpRs9 = Rs9
TmpRs10 = Rs10
TmpRs11 = Rs11
```

In this example there are only 3 separate writes to the database 125. Each write inserts 3, 7, and 11 records respectively and returns a map of the keys before and after each insert. This is a much more efficient way to use the database and network resources as readily understood by one skilled in the art.

More particularly, a computing system 100 performing the bulk loading includes a processor 110, a program memory 135 coupled to the processor and configured to store an application 145, and a database 125 coupled to the processor and the program memory. The processor 110 is configured to execute the application 145 to perform the following. A plurality of objects may be stored in the program memory 135, with the plurality of objects being organized in a relational hierarchy having a plurality of levels, and with each object having a respective pseudo-key associated therewith indicating its position within the relational hierarchy. These steps are represented by reference 410.

Figure 4:
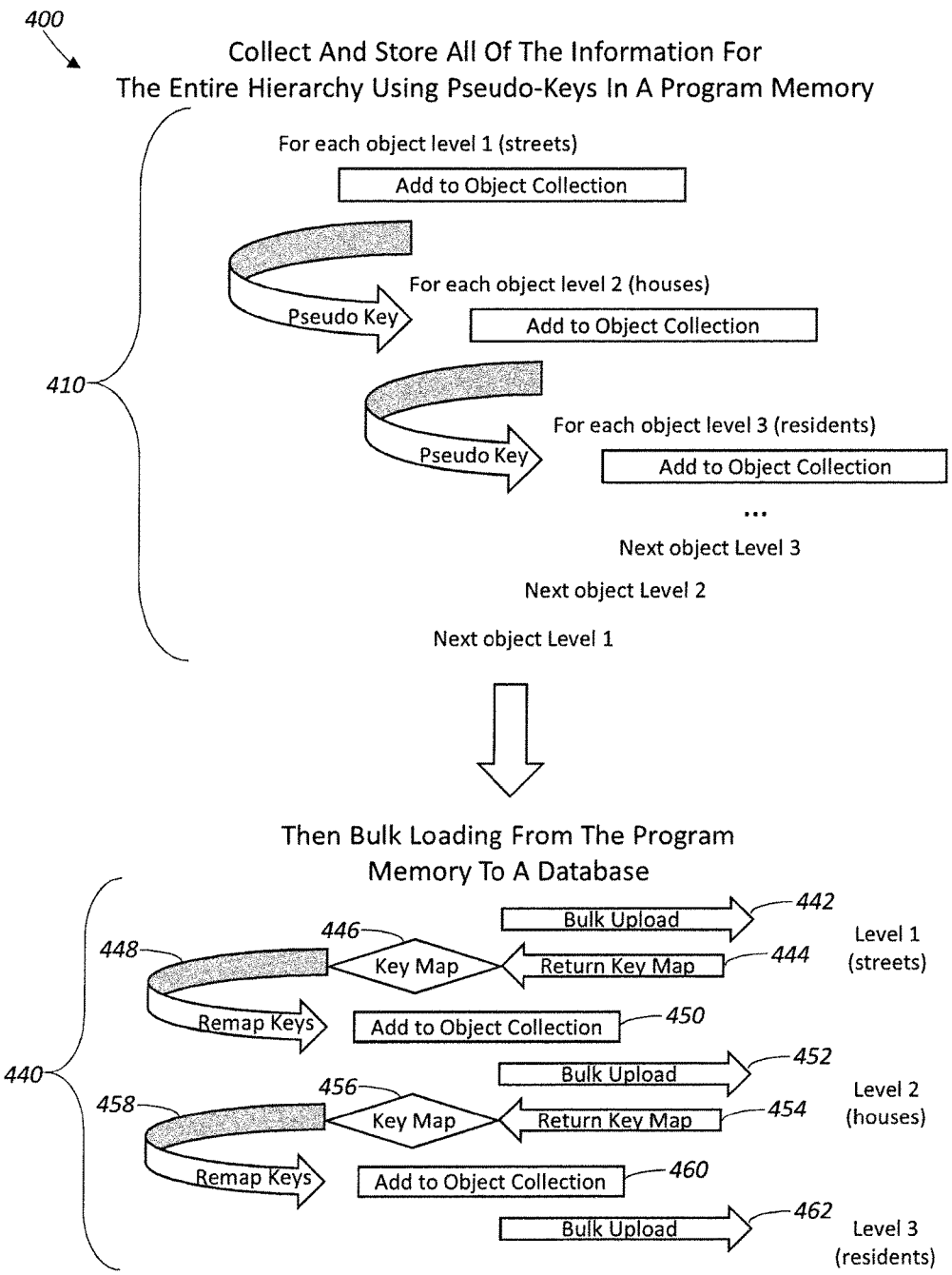
FIG. 4 is a bulk loading insert diagram for loading data in the example database entity diagram illustrated in FIG. 2 to a database.

Still referring to FIG. 4, after all of the information for the entire hierarchy using pseudo-keys are collected and stored in the program memory 135, which corresponds to reference 410, then bulk loading from the program memory 135 to the database 125 can be performed, which corresponds to reference 440.

The bulk loading starts with the objects and their respective pseudo-keys in the first level of the relational hierarchy being written to the database 125 at step 442, with the database 125 matching each pseudo-key in the first level with a real or actual key so as to generate the first level of the relational hierarchy with real keys. A first level key map or first level map 446 mapping the pseudo-keys with the real keys for the objects in the first level of the relational hierarchy is received by the processor 110 at step 444. The pseudo-keys for the objects in a second level of the relational hierarchy are reconciled with the first level key map 446 at step 450 using the remapped keys 448. The objects and their respective reconciled pseudo-keys in the second level of the relational hierarchy are written to the database 125 at step 452.

The processor 110 further performs the following for a next level in the relational hierarchy. A second level key map or second level map 456 mapping the pseudo-keys with the real keys for the objects in the second level of the relational hierarchy is received at step 454. The pseudo-keys for the objects in the third level of the relational hierarchy are reconciled with the second level key map 456 at step 460 using the remapped keys 458. The objects and their respective reconciled pseudo-keys in the third level of the relational hierarchy are written to the database at step 462.

The processor may further repeat the receive, reconcile and write steps for each additional level of the relational hierarchy. This advantageously allows an unlimited depth of relationships to be handled.

The application 145 as executed by the processor 110 advantageously allows bulk data to be efficiently written from the program memory 135 to the database 125. Once the structure of the whole relational hierarchy is known (corresponding to reference 410), then the bulk data may be written to the database 125 (corresponding to reference 440). The bulk loading is advantageously performed without being able to know in advance the internal database keys that will tie those relationships together.

As noted above, a complete structure of the relational hierarchy is known before the processor 110 performs a write to the database 125. The respective pseudo-keys are used to maintain relationships between the plurality of objects in the plurality of levels in the program memory (corresponding to reference 410).

The reconciling includes mapping the pseudo-keys for the objects in the second level with the real keys for the objects in the first level. Writing the objects and their respective pseudo-keys in the first level of the relational hierarchy to the database 125 may be performed in a single CALL statement. Similarly, writing the objects and their respective reconciled pseudo-keys in the second level of the relational hierarchy to the database may be performed in a single CALL statement that is separate from the single CALL statement used for the first level, and so on.

Figure 5:
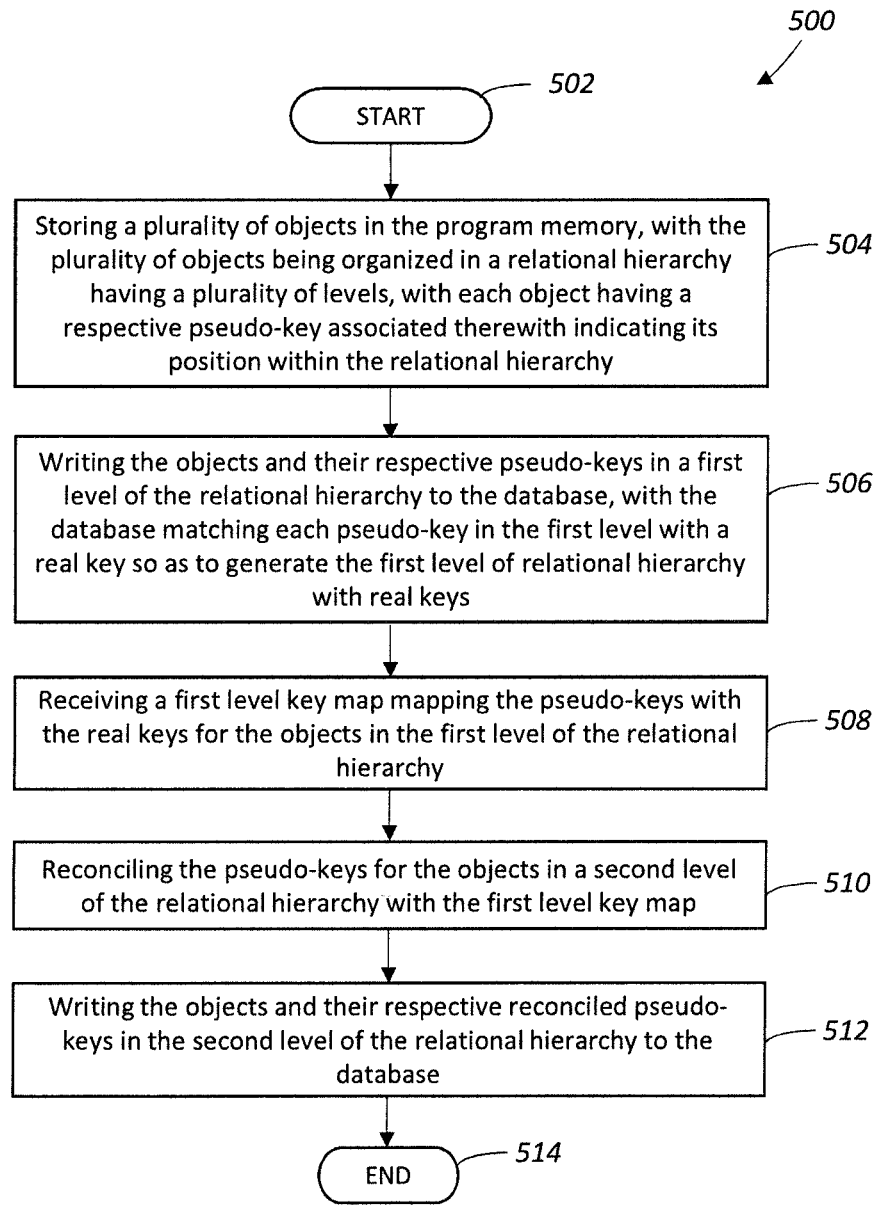
FIG. 5 is a flowchart illustrating a method for bulk loading multiple hierarchical levels of relational data from a program memory to a database using the computer system illustrated in FIG. 1.

Referring now to the flowchart 500 in FIG. 5, another aspect of the disclosure is directed to a method for operating a computing system 100 as described above. In particular, from the start (Bock 502), the processor may be operated to execute the application to perform the following. A plurality of objects may be stored in the program memory at Block 504, with the plurality of objects being organized in a relational hierarchy having a plurality of levels, and with each object having a respective pseudo-key associated therewith indicating its position within the relational hierarchy. The objects and their respective pseudo-keys in a first level of the relational hierarchy are written to the database 125 at Block 506, with the database matching each pseudo-key in the first level with a real key so as to generate the first level of the relational hierarchy with real keys. A first level key map mapping the pseudo-keys with the real keys for the objects in the first level of the relational hierarchy is received at Block 508. The pseudo-keys for the objects in a second level of the relational hierarchy are reconciled with the first level key map at Block 510. The objects and their respective reconciled pseudo-keys in the second level of the relational hierarchy are written to the database 125 at Block 512. The method ends at Block 514.

Yet another aspect is directed to a non-transitory computer readable memory having a plurality of computer executable instructions for causing a computing system comprising a processor 110, a program memory 135 coupled to the processor and configured to store an application 145, and a database 125 coupled to the processor and the program memory to perform the method steps as described above.

More particularly, a plurality of objects may be stored in the program memory, with the plurality of objects being organized in a relational hierarchy having a plurality of levels, and with each object having a respective pseudo-key associated therewith indicating its position within the relational hierarchy. The objects and their respective pseudo-keys in a first level of the relational hierarchy are written to the database 125, with the database matching each pseudo-key in the first level with a real key so as to generate the first level of the relational hierarchy with real keys. A first level key map mapping the pseudo-keys with the real keys for the objects in the first level of the relational hierarchy is received. The pseudo-keys for the objects in a second level of the relational hierarchy are reconciled with the first level key map. The objects and their respective reconciled pseudo-keys in the second level of the relational hierarchy are written to the database 125.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computing system comprising:
   a processor;
   a program memory coupled to said processor and to store an application;
   a database coupled to said processor and said program memory; and
   said processor to execute the application to perform the following:
   store a plurality of objects in said program memory, with the plurality of objects being organized in a relational hierarchy having a plurality of levels, with each object having a respective pseudo-key associated therewith indicating each object's position within the relational hierarchy,
   write in bulk the objects and the respective pseudo-keys in a first level of the relational hierarchy to said database, with said database matching each pseudo-key in the first level with an actual key to generate the first level of the relational hierarchy with actual keys,
   receive a first level map mapping the pseudo-keys with the actual keys for the objects in the first level of the relational hierarchy,
   reconcile the pseudo-keys for the objects in a second level of the relational hierarchy with the first level map, and
   write in bulk the objects and the respective reconciled pseudo-keys in the second level of the relational hierarchy to said database.

2. The computing system according to claim 1 wherein said processor further performs the following:
   receive a second level map mapping the pseudo-keys with the actual keys for the objects in the second level of the relational hierarchy;
   reconcile the pseudo-keys for the objects in a third level of the relational hierarchy with the second level map; and
   write in bulk the objects and the respective reconciled pseudo-keys in the third level of the relational hierarchy to said database.

3. The computing system according to claim 2 wherein said processor further repeats the receive, reconcile and write for each additional level of the relational hierarchy.

4. The computing system according to claim 1 wherein a complete structure of the relational hierarchy is known before said processor performs a write to said database.

5. The computing system according to claim 1 wherein the respective pseudo-keys are used to maintain relationships between the plurality of objects in the plurality of levels in said program memory.

6. The computing system according to claim 1 wherein the reconciling comprises mapping the pseudo-keys for the objects in the second level with the actual keys for the objects in the first level.

7. The computing system according to claim 1 wherein writing the objects and the respective pseudo-keys in the first level of the relational hierarchy to said database is performed in a single CALL statement.

8. The computing system according to claim 7 wherein the objects and the respective reconciled pseudo-keys in the second level of the relational hierarchy to said database is performed in a single CALL statement that is separate from the single CALL statement used for the first level.

9. The computing system according to claim 1 wherein the first level map is generated by said database, and stored in said program memory.

10. A method operating a computing system comprising a processor, a program memory coupled to the processor and to store an application, and a database coupled to the processor, the method comprising:
    operating the processor to execute the application to perform the following:
    storing a plurality of objects in the program memory, with the plurality of objects being organized in a relational hierarchy having a plurality of levels, with each object having a respective pseudo-key associated therewith indicating each object's position within the relational hierarchy,
    writing in bulk the objects and the respective pseudo-keys in a first level of the relational hierarchy to the database, with the database matching each pseudo-key in the first level with an actual key to generate the first level of the relational hierarchy with actual keys,
    receiving a first level map mapping the pseudo-keys with the actual keys for the objects in the first level of the relational hierarchy,
    reconciling the pseudo-keys for the objects in a second level of the relational hierarchy with the first level map, and
    writing in bulk the objects and the respective reconciled pseudo-keys in the second level of the relational hierarchy to the database.

11. The method according to claim 10 further comprising operating the processor to perform the following:
- receiving a second level map mapping the pseudo-keys with the actual keys for the objects in the second level of the relational hierarchy;
- reconciling the pseudo-keys for the objects in a third level of the relational hierarchy with the second level map; and
- writing in bulk the objects and the respective reconciled pseudo-keys in the third level of the relational hierarchy to the database.

12. The method according to claim 11 further comprising operating the processor to repeat the receiving, reconciling and writing for each additional level of the relational hierarchy.

13. The method according to claim 10 wherein a complete structure of the relational hierarchy is known before the processor performs a write to the database.

14. The method according to claim 10 wherein the respective pseudo-keys are used to maintain relationships between the plurality of objects in the plurality of levels in the program memory.

15. The method according to claim 10 wherein the reconciling comprises mapping the pseudo-keys for the objects in the second level with the actual keys for the objects in the first level.

16. The method according to claim 10 wherein writing the objects and the respective pseudo-keys in the first level of the relational hierarchy to the database is performed in a single CALL statement, and wherein the objects and the respective reconciled pseudo-keys in the second level of the relational hierarchy to the database is performed in a single CALL statement that is separate from the single CALL statement used for the first level.

17. A non-transitory computer readable memory having a plurality of computer executable instructions for causing a computing system comprising a processor, a program memory coupled to the processor and to store an application, and a database coupled to the processor and the program memory to perform steps comprising:
- operating the processor to execute the application to perform the following:
  - storing a plurality of objects in the program memory, with the plurality of objects being organized in a relational hierarchy having a plurality of levels, with each object having a respective pseudo-key associated therewith indicating each object's position within the relational hierarchy,
  - writing in bulk the objects and the respective pseudo-keys in a first level of the relational hierarchy to the database, with the database matching each pseudo-key in the first level with an actual key to generate the first level of the relational hierarchy with actual keys,
  - receiving a first level map mapping the pseudo-keys with the actual keys for the objects in the first level of the relational hierarchy,
  - reconciling the pseudo-keys for the objects in a second level of the relational hierarchy with the first level map, and
  - writing in bulk the objects and the respective reconciled pseudo-keys in the second level of the relational hierarchy to the database.

18. The non-transitory computer readable memory according to claim 17 further comprising operating the processor to perform the following:
- receiving a second level map mapping the pseudo-keys with the actual keys for the objects in the second level of the relational hierarchy;
- reconciling the pseudo-keys for the objects in a third level of the relational hierarchy with the second level map; and
- writing in bulk the objects and the respective reconciled pseudo-keys in the third level of the relational hierarchy to the database.

19. The non-transitory computer readable memory according to claim 18 further comprising operating the processor to repeat the receiving, reconciling and writing for each additional level of the relational hierarchy.

20. The non-transitory computer readable memory according to claim 17 wherein a complete structure of the relational hierarchy is known before the processor performs a write to the database.

21. The non-transitory computer readable memory according to claim 17 wherein the reconciling comprises mapping the pseudo-keys for the objects in the second level with the actual keys for the objects in the first level.

22. The non-transitory computer readable memory according to claim 17 wherein writing the objects and the respective pseudo-keys in the first level of the relational hierarchy to the database is performed in a single CALL statement, and wherein the objects and the respective reconciled pseudo-keys in the second level of the relational hierarchy to the database is performed in a single CALL statement that is separate from the single CALL statement used for the first level.

* * * * *